Nov. 16, 1965  A. MONACO  3,217,945
DISPENSING DEVICE
Filed Dec. 27, 1963

INVENTOR.
Alexander Monaco
BY Harold E. Cole
Attorney

United States Patent Office 3,217,945
Patented Nov. 16, 1965

3,217,945
DISPENSING DEVICE
Alexander Monaco, 18 Bloomfield St., Boston, Mass.
Filed Dec. 27, 1963, Ser. No. 333,868
4 Claims. (Cl. 222—361)

This invention relates to a dispensing device, especially one that measures and dispenses articles such as coffee, tea and the like.

One object of my invention is to provide a dispensing device of simplified construction that requires only one moving part, thus avoiding combinations of moving parts that may become stuck or otherwise get out of order.

Another object is to provide a dispensing device that has a relatively large opening where it receives articles from a supply receptacle and a relatively small bottom opening where they pass out of my device, thus avoiding congestion between the supply receptacle and the hopper that receives the articles and later permits their discharge from the device.

A further object is to provide a dispensing device that is relatively easy to construct, the cost of which is economical and which is attractive in appearance.

The foregoing and other objects which will appear as the nature of the invention is better understood, may be accomplished by a construction, combination and arrangement of parts such as disclosed by the drawing. The nature of the invention is such as to render it susceptible to various changes and modifications, and therefore, I am not to be limited to the construction disclosed by the drawing nor to the particular parts described in the specification; but am entitled to all such changes therefrom as fall within the scope of my claims.

Figure 1:
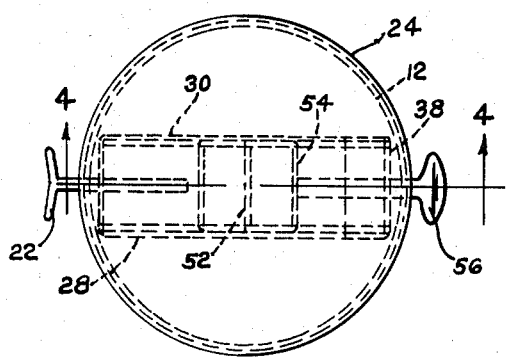
FIG. 1 is a top plan view of my dispensing device showing the hopper in normal or receiving position.

As illustrated, my dispensing device has a supply receptacle 10 which is open at the bottom that provides a discharge opening. The upper portion 12 is cylindrical, and extending downwardly therefrom is a tapering portion having a front wall 14, a rear wall 16, a side wall 18 and a side wall 20 connected together to form the lower portion of said supply receptacle. Attached to said rear wall 16 is a well-known bracket 22 that can be connected to an attaching member, not shown, fastened to a wall. Said walls 14, 16, 18 and 20 extend diagonally downward and inward, leaving said receptacle open at the bottom. A cover 24 fits over said receptacle upper portion 12.

A guide member 25 is fixedly attached to said supply receptacle 10, as by welding a top plate 26 thereto. The latter has an intermediate discharge opening 32, later described, that is in alinement with the supply receptacle bottom discharge opening. Said top plate 26 is shown extending laterally beyond the receptacle bottom opening at opposite sides thereof. It has U-shaped, open guides formed by flange portions 28 and 30 that extend downwardly and inwardly from opposite sides and are spaced from the top surface of said plate 26.

Figure 4:
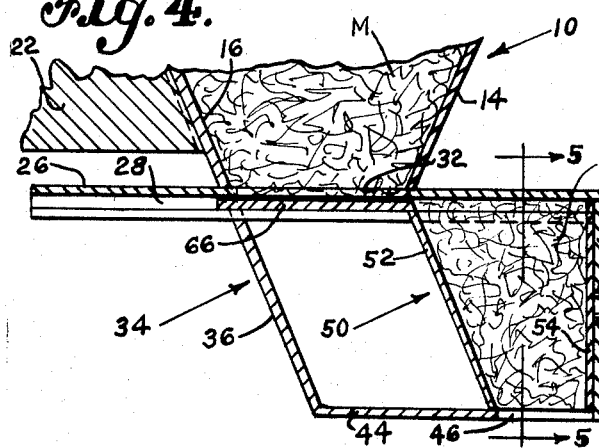
FIG. 4 is an enlarged, fragmentary, sectional view taken on the line 4—4 of FIG. 1; but showing the hopper in discharge position.
Figure 5:
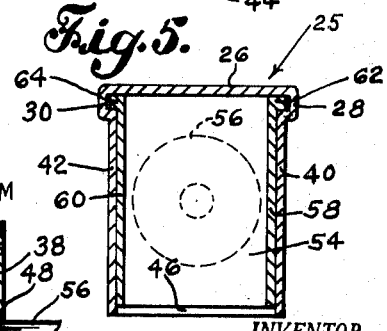
FIG. 5 is a sectional view taken on the line 5—5 of FIG. 4.

A housing 34 is open at the top and is attached to said guide member 25 at said flange portions 28 and 30 as shown, as by welding. This housing has a rear wall portion 36 as shown in said FIG. 4 that slants diagonally downward and forward, the slant corresponding to and being in alinement with said supply receptacle wall 16. Said housing has a front wall 38 opposite side walls 40 and 42 and a bottom 44 which has an opening 46 therein at the front thereof which extends to the front wall 38. Said front wall 38 has a hole 48 therethrough.

Slidable within said housing 34 is a hopper or dispenser 50 that is open at the top that in normal position is in alinement with said discharge opening 32 and said receptacle bottom opening. This hopper has a rear wall or back 52 that slants diagonally downward and forward, corresponding with said housing rear wall portion 36 so that the articles from said receptacle may fall in a direction towards the front of the dispenser and also so the discharge opening at the bottom of said dispenser 50 will be smaller than the receiving portion later referred to. Said hopper 50 has a front wall 54 that preferably extends vertically and to which a handle or pull rod 56 is attached, the latter passing through said housing hole 48. It also has two sides 58 and 60 from which lips 62 and 64 respectively are shown, that extend from the top laterally outward and slidably extend into open guides 28 and 30.

Attached to said hopper rear wall 52 at the top thereof is a closure extension 66 that extends rearwardly thereof. In normal position it is also rearward of said guide member discharge opening 32 hence there is no obstruction to prevent articles or material M from the receptacle 10 passing into and filling said hopper or dispenser 50. However, when the hopper is moved to discharge position, shown in said FIG. 4, directly above said housing bottom opening 46, said closure extension 66 is directly under said guide member discharge opening 32, hence no articles can pass out of the supply receptacle bottom opening. In this discharge position the housing front 38 serves as a stop to said hopper front 54.

Figure 6:
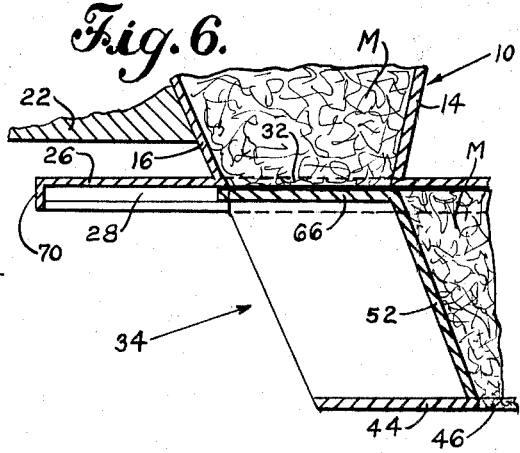
FIG. 6 is a sectional view similar to FIG. 4, showing a modification of my device.
Figure 2:
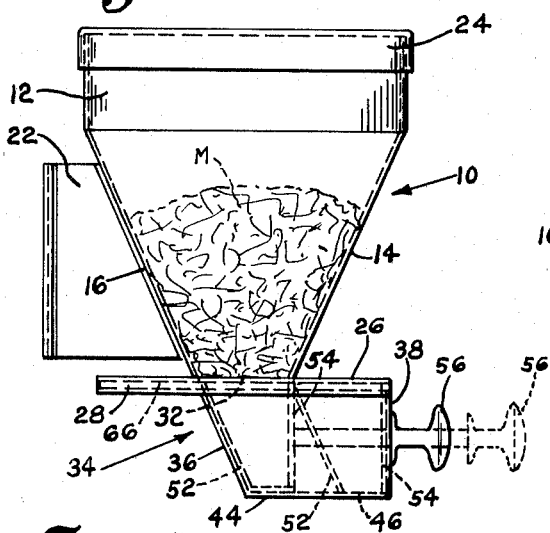
FIG. 2 is a side elevational view thereof, the dash lines showing the hopper and handle in both normal and discharge positions.
Figure 3:
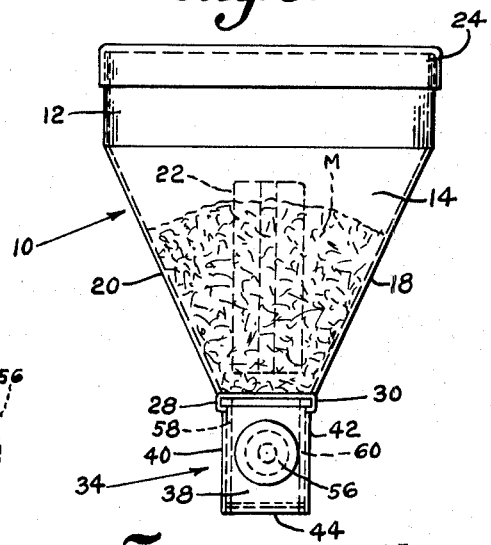
FIG. 3 is a front elevational view of my dispensing device.

In FIG. 6 of the drawings, I show a modified form of my device in which the guide member top plate 26 has an angular stop member 70 at the rear end extending downwardly, which terminates the movement of said closure extension 66 when said hopper 50 reaches normal position. In this modification said housing 34 is left open at the rear by omitting said rear wall portion 36.

What I claim is:

1. A dispensing device comprising a supply receptacle having a discharge opening, a guide member fixedly attached to said receptacle embodying guide means at opposite sides and having a discharge opening in alinement with said receptacle discharge opening, said guide member extending rearwardly beyond its discharge opening, a housing fixedly attached to said guide member, having an opening at the top in alinement with said discharge openings and having a front, a bottom and sides connected together, said housing bottom having an opening at the front portion, and a hopper open at the bottom and the top and having an upper closure member rearwardly of said latter top opening the opposite sides of which are movably connected to said guide means, said hopper having a front wall and a rear wall attached to said upper closure member and movable therewith, and two sides attached to said front and rear walls, said upper closure member extending rearwardly of said hopper rear wall to thereby leave said hopper top opening in alinement with said discharge openings when in normal position, said upper closure member being adapted to close said discharge openings and said housing top opening, said hopper bottom opening being in alinement with said housing bottom opening when said hopper is moved to discharge position, and means attached to said hopper to move it between normal and discharge positions, said supply receptacle having a side portion extending diagonally downward and forward and said hopper rear wall extending diagonally downward and forward in substantial alinement with said receptacle side portion.

2. A dispensing device comprising a supply receptacle having a discharge opening, a guide member fixedly attached to said receptacle embodying guide means at opposite sides and having a discharge opening in alinement with said receptacle discharge opening, said guide member extending rearwardly beyond its said discharge opening, a housing fixedly attached to said guide member, having an opening at the top in alinement with said discharge openings and having a front, a bottom and sides connected together, said housing bottom having an opening at the front portion, and a hopper open at the bottom and the top and having an upper closure member rearwardly of said latter top opening the opposite sides of which are movably connected to said guide means, said hopper having a front wall and a rear wall attached to said upper closure member and movable therewith, and two sides attached to said front wall and rear walls, said upper closure member extending rearwardly of said hopper rear wall to thereby leave said hopper top opening in alinement with said discharge openings when in normal position, said upper closure member being adapted to close said discharge openings and said housing top opening, said hopper bottom opening being in alinement with said housing bottom opening when said hopper is moved to discharge position, and means attached to said hopper to move it between normal and discharge positions, said guide member having a downwardly depending stop member at the rear end thereof in the path of movement of said closure member when said hopper is in normal position thereby terminating the movement rearwardly of said closure member.

3. A dispensing device comprising a supply receptacle having a discharge opening, a guide member fixedly attachced to said receptacle embodying open guide flanges at opposite sides and having a discharge opening in alinement with said receptacle discharge opening, said guide member extending rearwardly beyond its said discharge opening, a housing fixedly attached to said guide member and supported by said guide member and having an opening at the top in alinement with said discharge openings and having a front, a bottom and sides connected together, said housing bottom having an opening at the front portion, a hopper open at the bottom and the top and having an upper closure member rearwardly of said latter top opening the opposite sides of which slidably extend into said open guide flanges, said hopper having a front wall and a rear wall attached to said upper closure member and movable therewith, and two sides attached to said front and rear wall, said upper closure member extending rearwardly of said hopper rear wall to thereby leave said hopper top opening in alinement with said discharge openings when in normal position, said upper closure member being adapted to close said discharge openings and said housing top opening, said hopper bottom opening being in alinement with said housing bottom opening when said hopper is moved to discharge position, and means attached to said hopper front to move it between normal and discharge position.

4. A dispensing device as set forth in claim 1 in which said housing front and said hopper front extend vertically.

References Cited by the Examiner

UNITED STATES PATENTS

| | | | |
|---|---|---|---|
| 1,758,999 | 5/1930 | Carns | 222—361 |
| 1,968,641 | 7/1934 | Greig | 222—361 X |
| 2,077,980 | 4/1937 | Bell | 222—361 X |
| 2,131,831 | 10/1938 | Aldrich | 222—361 |
| 2,852,167 | 9/1958 | Lempart | 222—361 X |

FOREIGN PATENTS

| | | |
|---|---|---|
| 1,237,209 | 6/1960 | France. |

LOUIS J. DEMBO, *Primary Examiner.*